Patented Apr. 19, 1932

1,854,186

UNITED STATES PATENT OFFICE

ROSCOE H. GERKE, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

PRODUCTION OF SYNTHETIC RUBBER POLYMERS

No Drawing. Application filed September 24, 1928. Serial No. 308,140.

This invention relates to the production of synthetic rubber polymers, particularly those derived from 1-3 diene hydrocarbons.

It is known that derivatives of erythrene can be polymerized by treatment with air, oxygen or organic substances with oxygen in a loose state of combination. The use of air for instance, has been found inefficient. Inorganic peroxides as catalysts have also been used but they are not greatly different in their efficiency than the use of air alone as inorganic catalysts. Inorganic peroxides are comparatively cheap and one of the objects of this invention is to make them available as catalysts in the polymerization of 1-3 diene hydrocarbons with increased efficiency.

It has been found that when an inorganic peroxide is mixed with certain organic substances, that the admixture gives a marked increase in the yield of synthetic polymer over and above that of the inorganic peroxide alone. Organic anhydrides are particularly efficacious in this respect when added to the inorganic peroxides.

Three specific examples illustrating the invention are given below:

The procedure for all three examples is substantially identical and is as follows:—
The hydrocarbon, erythrene was distilled into a small pyrex glass tube similar to a test tube. The erythrene was caused to liquefy in the tube by cooling with carbon dioxide snow and acetone which produced a temperature of about −80° C. This is necessary as the erythrene boils in the neighborhood of 0° C. The tubes all contained air. All the tubes were sealed in air by melting the glass with an oxygen-gas blast flame, the erythrene being chilled to −80° C. All the tubes were heated for 89 hours at 100° C. in an automatic glycerine thermostat. At the end of the heating period the tubes were removed from the bath and allowed to cool at room temperature, subsequently to −80° C. and were opened by breaking the glass tube. The opened glass tube containing the polymerized and unpolymerized erythrene was warmed to room temperature and most of the unpolymerized erythrene was allowed to escape. The remainder was removed by evacuating at 70° C. for 24 hours. The weight of the polymer produced is determined by subtracting the loss in weight by removing the unpolymerized hydrocarbon from the weight of original hydrocarbon. The percentage yield is 100 times the ratio of the weight of synthetic rubber polymer to the total weight of hydrocarbon in the tube. All the specific examples listed below are compared with the polymerizing efficiency of the catalysts, air, and air plus barium peroxide.

|  | Air blank | Barium peroxide blank | Example 1 | Example 2 |
|---|---|---|---|---|
| Parts erythrene | 100 | 100 | 100 | 100 |
| Parts barium peroxide | 0 | 2.1 | 2.1 | 2.1 |
| Parts activating catalyst | 0 | 0 | 3 (acetic anhydride) | 4 (benzoic anhydride) |
| Percentage yield synthetic rubber polymer | 18.8 | 14.6 | 38.1 | 40.8 |

Example 3

Parts erythrene _____ 100
Parts barium peroxide _____ 2.1
Parts activating catalyst _____ 4
(phthalic anhydride)
Percentage yield synthetic rubber polymer _____ 29.7

Example 4.—Yield of synthetic rubber polymer in presence of organic anhydride and inorganic peroxide after 89 hours at 100° C.

|  | Air blank | Barium peroxide blank | Anhydride blank | Combined peroxide anhydride |
|---|---|---|---|---|
| Parts erythrene | 100 | 100 | 100 | 100 |
| Parts barium peroxide | None. | 2.1 | None. | 2.1 |
| Parts acetic anhydride | None. | None. | 3.0 | 3.0 |
| Percentage yield | 20.1 | 20.7 | 14.2 | 35.0 |

From the above it will be seen that no greater yield is obtained by the acetic anhydride than by the use of air alone.

The invention is not to be limited to the use of the particular materials given in the examples as other inorganic peroxides, other organic anhydrides, 1-3 dienes and derivatives of erythrene may be used without departing from the basic principles of the invention. Also with the detailed disclosure given above it is obvious many modifications will suggest themselves and it is not desired to limit the invention otherwise than as set forth in the appended claims.

Having thus described my invention, what I claim and desire to protect by Letters Patent is:

1. The method of making a synthetic rubber polymer which comprises polymerizing a 1-3 diene in the presence of an inorganic peroxide and an organic acid anhydride, and removing the unpolymerized diene.

2. The method of making a synthetic rubber polymer which comprises polymerizing a 1-3 diene in the presence of an inorganic peroxide and benzoic anhydride, and removing the unpolymerized diene.

3. The method of making a synthetic rubber polymer which comprises activating an inorganic peroxide with an organic acid anhydride, in the presence of a 1-3 diene, and polymerizing the 1-3 diene.

4. The method of making a synthetic rubber polymer which comprises activating an inorganic peroxide with an organic acid anhydride, in the presence of erythrene, and polymerizing the erythrene.

5. The method of making a synthetic polymer which comprises polymerizing erythrene in the presence of an inorganic peroxide and an organic acid anhydride and removing the unpolymerized erythrene.

6. The method of making a synthetic rubber polymer which comprises polymerizing erythrene in the presence of an inorganic peroxide and benzoic anhydride, and removing the unpolymerized erythrene.

7. The method of making a synthetic rubber polymer which comprises polymerizing erythrene in the presence of barium peroxide and benzoic anhydride, and removing the unpolymerized erythrene.

8. A synthetic rubber polymer derived from a 1-3 diene polymerized in the presence of an inorganic peroxide and an organic anhydride.

9. A synthetic rubber polymer derived from erythrene polymerized in the presence of an inorganic peroxide and an organic anhydride.

10. The method of making a synthetic rubber polymer which comprises activating an inorganic peroxide with benzoic anhydride, in the presence of erythrene, and polymerizing the erythrene.

11. The method of making a synthetic rubber polymer which comprises polymerizing a 1-3 diene in the presence of an inorganic peroxide and acetic anhydride, and removing the unpolymerized diene.

12. The method of making a synthetic rubber polymer which comprises polymerizing a 1-3 diene in the presence of barium peroxide and acetic anhydride, and removing the unpolymerized diene.

13. The method of making a synthetic rubber polymer which comprises polymerizing erythrene in the presence of an inorganic peroxide and acetic anhydride, and removing the unpolymerized erythrene.

Signed at Passaic, county of Passaic, State of New Jersey, this 19th day of September, 1928.

ROSCOE H. GERKE.